United States Patent [19]

Yuasa et al.

[11] Patent Number: 5,346,781
[45] Date of Patent: * Sep. 13, 1994

[54] ALKALINE STORAGE BATTERY

[75] Inventors: Kohji Yuasa, Moriguchi; Munehisa Ikoma, Katano; Hiroshi Kawano, Ibaraki; Osamu Takahashi, Fujisawa; Isao Matsumoto, Osaka, all of Japan

[73] Assignee: Matsushita Electric Industrial Co., Ltd., Osaka, Japan

[*] Notice: The portion of the term of this patent subsequent to Jul. 23, 2008 has been disclaimed.

[21] Appl. No.: 646,012

[22] Filed: Jan. 28, 1991

Related U.S. Application Data

[63] Continuation-in-part of Ser. No. 356,246, May 24, 1989, Pat. No. 5,034,289.

[30] Foreign Application Priority Data

Feb. 23, 1989 [JP] Japan ................................ 1-43709

[51] Int. Cl.$^5$ ........................................... H01M 10/24
[52] U.S. Cl. ...................................... 429/59; 429/206; 429/218; 429/212
[58] Field of Search ........................ 429/59, 57, 53, 101, 429/206, 248, 218

[56] References Cited

U.S. PATENT DOCUMENTS

| | | | |
|---|---|---|---|
| 3,850,694 | 11/1974 | Dunlop et al. | 429/27 X |
| 4,214,043 | 7/1980 | van Deutekom | 429/27 |
| 4,312,928 | 1/1982 | van Deutekom | 429/27 |
| 4,487,817 | 12/1984 | Willems et al. | 429/27 |
| 4,605,603 | 8/1986 | Kanda et al. | 429/59 |
| 4,636,445 | 1/1987 | Yamano et al. | 429/53 |
| 4,702,978 | 10/1987 | Heuts et al. | 429/218 |
| 4,752,546 | 6/1988 | Heuts et al. | 429/218 |
| 4,826,744 | 5/1989 | Itou et al. | 429/206 |
| 4,837,119 | 6/1989 | Ikoma et al. | 429/206 |
| 4,925,748 | 5/1990 | Ikoma et al. | 429/101 X |
| 5,034,289 | 2/1991 | Yuasa et al. | 429/59 |

FOREIGN PATENT DOCUMENTS

| | | |
|---|---|---|
| 0271043 | 6/1988 | European Pat. Off. |
| 2382774 | 9/1978 | France |
| 58-46830 | 10/1983 | Japan |
| 59-37667 | 3/1984 | Japan |
| 60-100382 | 6/1985 | Japan |
| 60-109183 | 6/1985 | Japan |
| 60-212958 | 10/1985 | Japan |
| 60-220556 | 11/1985 | Japan |
| 61-64068 | 4/1986 | Japan |
| 61-118963 | 6/1986 | Japan |
| 61-151967 | 7/1986 | Japan |
| 62-139255 | 6/1987 | Japan |
| 63-195960 | 8/1988 | Japan |
| 63-304570 | 12/1988 | Japan |

OTHER PUBLICATIONS

Chemical Abstracts, Abstract No. 158314t, vol. 107, No. 18, p. 249, Nov. 2, 1987, Columbus, Ohio.
Chemical Abstracts, Abstract No. 234219z, vol. 109, No. 26, p. 193, Dec. 26, 1988, Columbus, Ohio.

(List continued on next page.)

*Primary Examiner*—Anthony Skapars
*Attorney, Agent, or Firm*—Stevens, Davis, Miller & Mosher

[57] ABSTRACT

Disclosed is an alkaline storage battery, in which the negative electrode is constituted by a hydrogen absorbing alloy capable of absorbing/desorbing hydrogen electrochemically, and a hydrophobic material is provided in the space between the surface of the negative electrode and the separator while a hydrophilic material is provided in the inside of the negative electrode, thereby properly secure both wetting property and surface hydrophobic property of the negative electrode against the alkaline electrolytic solution. Accordingly, a hydrogen gas generated in charging the battery can be absorbed by a vapor phase reaction in the hydrophobic portion in the surface of the negative electrode which is exposed to the vapor phase and can be absorbed electrochemically in the portion of the negative electrode which is wetted by the electrolytic solution, so that the inner pressure of the battery can be reduced to thereby make it possible to perform quick charging.

22 Claims, 7 Drawing Sheets

1 --- NEGATIVE ELECTRODE
2 --- NICKEL POSITIVE ELECTRODE
3 --- SEPARATOR
4 --- CASE
5 --- POSITIVE ELECTRODE CAP
6 --- SAFETY VENT
7 --- SEALING PLATE
8 --- INSULATING GASKET
9 --- POSITIVE ELECTRODE COLLECTOR

OTHER PUBLICATIONS

Chemical Abstracts, Abstract No. 152446d, vol. 104, No. 18, p. 209, May 5, 1986, Columbus, Ohio.
Chemical Abstracts, Abstract No. 144853y, vol. 103, No. 18, p. 172, Nov. 4, 1985, Columbus, Ohio.
Chemical Abstracts, Abstract No. 113952j, vol. 101, No. 14, p. 170, Oct. 1, 1984, Columbus, Ohio.
Chemical Abstracts, Abstract No. 27171e, vol. 105, No. 4, p. 181, Jul. 28, 1986, Columbus, Ohio.
Patent Abstracts of Japan, vol. 10, No. 352 (E-458) [2408], Nov. 27, 1986.
Patent Abstracts of Japan, vol. 10, No. 61 (E-387) [2118], Mar. 11, 1986.
Chemical Abstracts, Abstract No. 142237q, vol. 100, No. 18, p. 182, Apr. 30, 1984, Columbus, Ohio.

F I G. 1
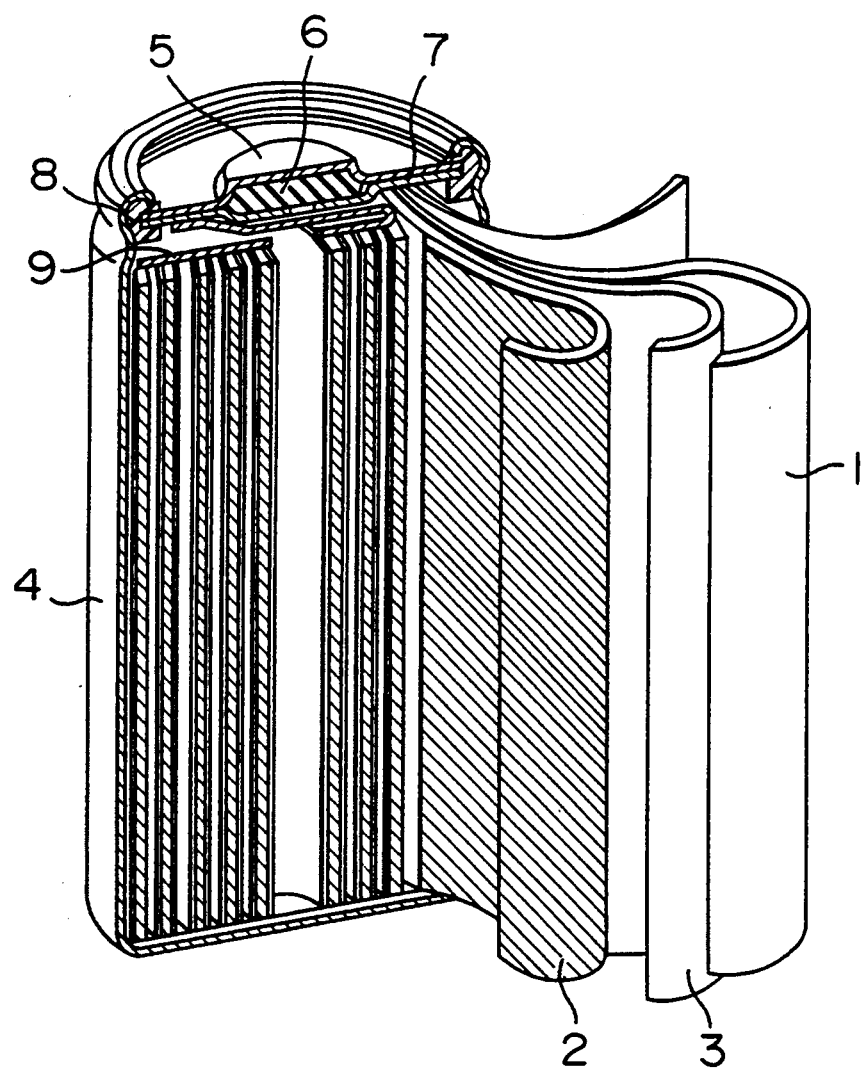
1 ---- NEGATIVE ELECTRODE
2 --- NICKEL POSITIVE ELECTRODE
3 --- SEPARATOR
4 --- CASE
5 --- POSITIVE ELECTRODE CAP
6 --- SAFETY VENT
7 --- SEALING PLATE
8 --- INSULATING GASKET
9 --- POSITIVE ELECTRODE COLLECTOR

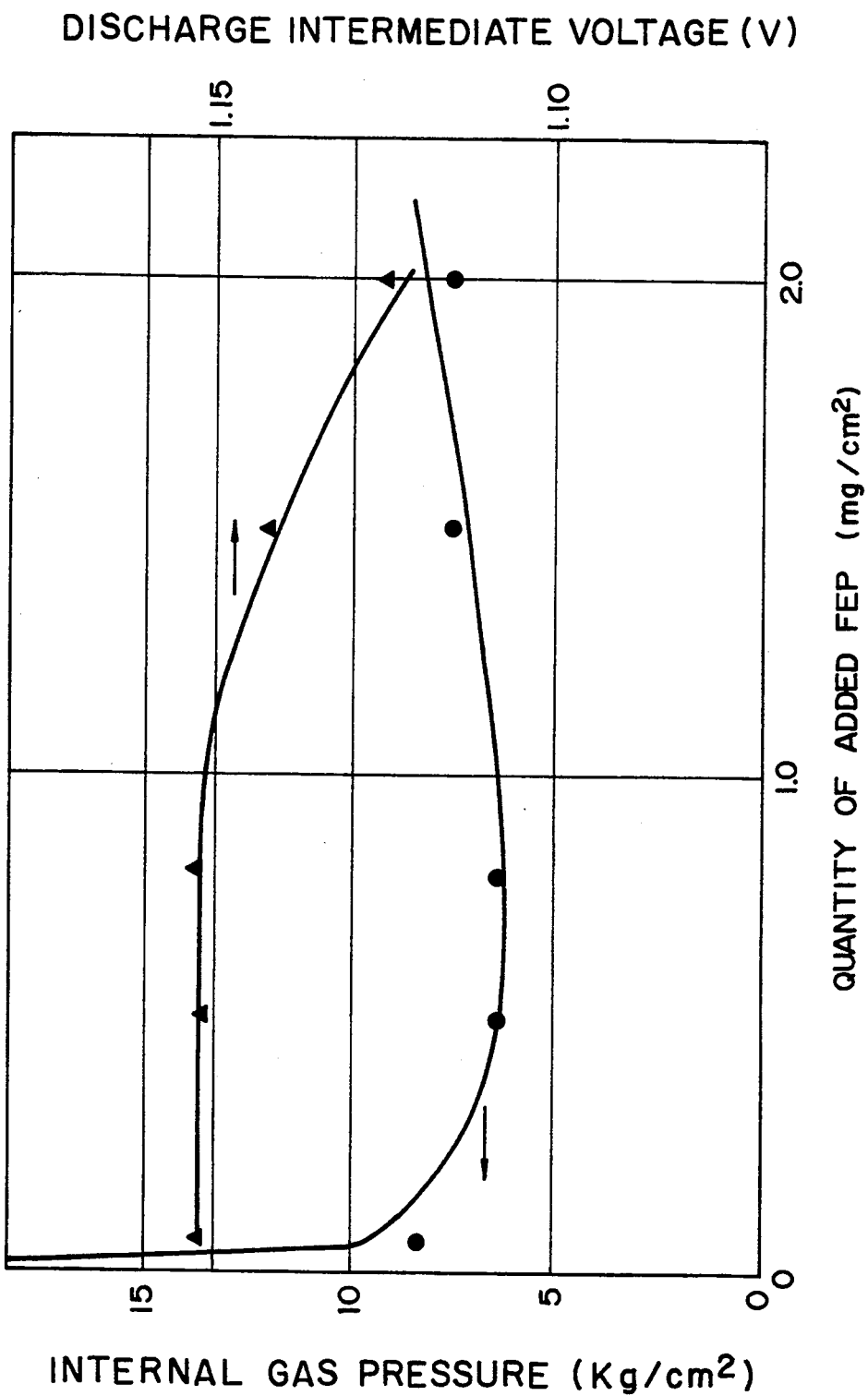

ALKALINE STORAGE BATTERY

CROSS REFERENCE TO RELATED APPLICATION

This is a continuation-in-part of application Ser. No. 356,246, May 24, 1989, now U.S. Pat. No. 5,034,289.

BACKGROUND OF THE INVENTION

The present invention relates to an alkaline storage battery using a negative electrode of a hydrogen absorbing alloy.

Recently, hydrogen absorbing alloys capable of electrochemically absorbing/desorbing a great deal of hydrogen serving as an active material have attracted attention as an electrode material of high energy density and have been intended to be applied to a closed alkaline storage battery to be developed into a high capacity storage battery, in particular, to be applied to a closed nickel-hydrogen storage battery.

The electrode reaction in such a closed nickel-hydrogen storage battery is as follows.

Positive electrode:

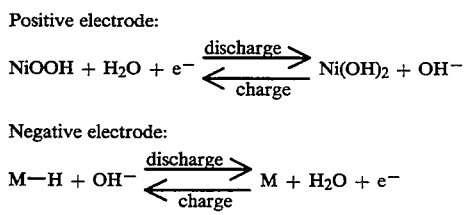
(1)

Negative electrode:

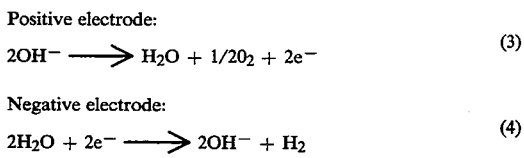
(2)

In the reaction equation (2), M represents a hydrogen absorbing alloy.

A hydrogen absorbing alloy negative electrode for use in this type storage battery is prepared by a process in which an alkali-resisting organic high molecule, such as polyethylene, fluorocarbon polymer, or the like, is added as a binding agent to a pulverized hydrogen absorbing alloy, and the resulting mixture is pressed onto or filled into an electrically conductive collector such as a punching metal or a foam metal.

When the battery is overcharged, gas generation reactions represented by the following equations (3) and (4) occur on the positive electrode and the negative electrode of the battery, respectively.

Positive electrode:

$$2OH^- \longrightarrow H_2O + 1/2O_2 + 2e^- \quad (3)$$

Negative electrode:

$$2H_2O + 2e^- \longrightarrow 2OH^- + H_2 \quad (4)$$

To suppress the increase of the battery inner pressure, a method in which an oxygen gas generated from the positive electrode according to the equation (3) is made to react with hydrogen absorbed in the negative electrode to thereby generate water has been employed. To suppress the generation of a hydrogen gas according to the equation (4), a method in which the capacity of the negative electrode is established to be larger than the capacity of the positive electrode has been employed.

When the battery is charged rapidly, however, the rate of generation of an oxygen gas is often larger than the rate of absorption of the same gas so that the oxygen gas is accumulated in the battery to thereby increase the inner pressure of the battery. To eliminate the aforementioned disadvantage, a method of accelerating reduction of an oxygen gas by adding a noble metal catalyst such as platinum to the negative electrode (as disclosed in Japanese Patent Unexamined Publication No. 60-100382), a method of accelerating absorption of an oxygen gas onto the negative electrode by providing a hydrophobic layer in the hydrogen absorbing alloy negative electrode (as disclosed in Japanese Patent Unexamined Publication No. 61-118963), and the like, are known.

However, various problems arise in the aforementioned, conventional construction of the battery as follows. The method of adding a noble metal to the negative electrode has a problem in that the material cost is increased. On the other hand, the method of providing a hydrophobic layer in the negative electrode has a problem in that the discharging voltage is dropped because of the uneven electrolyte distribution of the negative electrode and the decrease of the effective surface area for the electrochemical reaction. Further, the aforementioned method is effective for improving the oxygen absorption capacity of the negative electrode but has another problem in that the inner pressure of the battery is increased because hydrogen is to be generated from the negative electrode in charging the battery with lowering of the wetting property for the electrolytic solution, of the inside of the hydrogen absorbing alloy negative electrode. In particular, this fact is remarkable when the battery is charged rapidly.

OBJECTS AND SUMMARY OF THE INVENTION

An object of the present invention is therefore to solve the aforementioned problems.

Another object of the invention is to provide a hydrogen absorbing alloy negative electrode of a battery, in which the wetting property of the inside of the negative electrode against an electrolytic solution can be improved while the hydrophobic property is kept at the same time in the vicinity of the surface of the negative electrode can be kept suitably, by which not only the inner pressure of the battery can be reduced in charging the battery rapidly but also voltage drop can be prevented in discharging the battery.

To solve the aforementioned problems, according to the present invention, provided is a construction of an alkaline storage battery in which a hydrophobic material is provided at a part of or at a greater part of a surface layer opposite to a negative electrode of a separator, or in which a hydrophilic resin is provided in the inside of a negative electrode formed of a hydrogen absorbing alloy, a hydrophobic resin is provided on the surface portion of the negative electrode and a hydrophobic agent is provided between a separator and the negative electrode.

In the construction, according to the present invention, a hydrogen gas is absorbed by providing the hydrophobic resin between the surface of the hydrogen absorbing alloy negative electrode and the separator. Further, the wetting property of the inside of the hydrogen absorbing alloy negative electrode against an electrolytic solution is improved by use of the hydrophilic resin to make it easier to absorb hydrogen electrically so as to suppress the generation of a hydrogen gas to thereby reduce the inner pressure of the battery in charging the battery rapidly. Further, the voltage drop in discharging the battery can be prevented by the addition of the hydrophilic resin.

DESCRIPTION OF THE DRAWINGS

FIG. 1 is a sectional view of a nickel-hydrogen storage battery produced according to the present invention;

FIG. 7 is a graph view showing the relation among the quantity of addition of FEP of the separator, the battery inner pressure and the intermediate voltage when the battery is discharged.

DETAILED DESCRIPTION OF THE INVENTION

Figure 2:
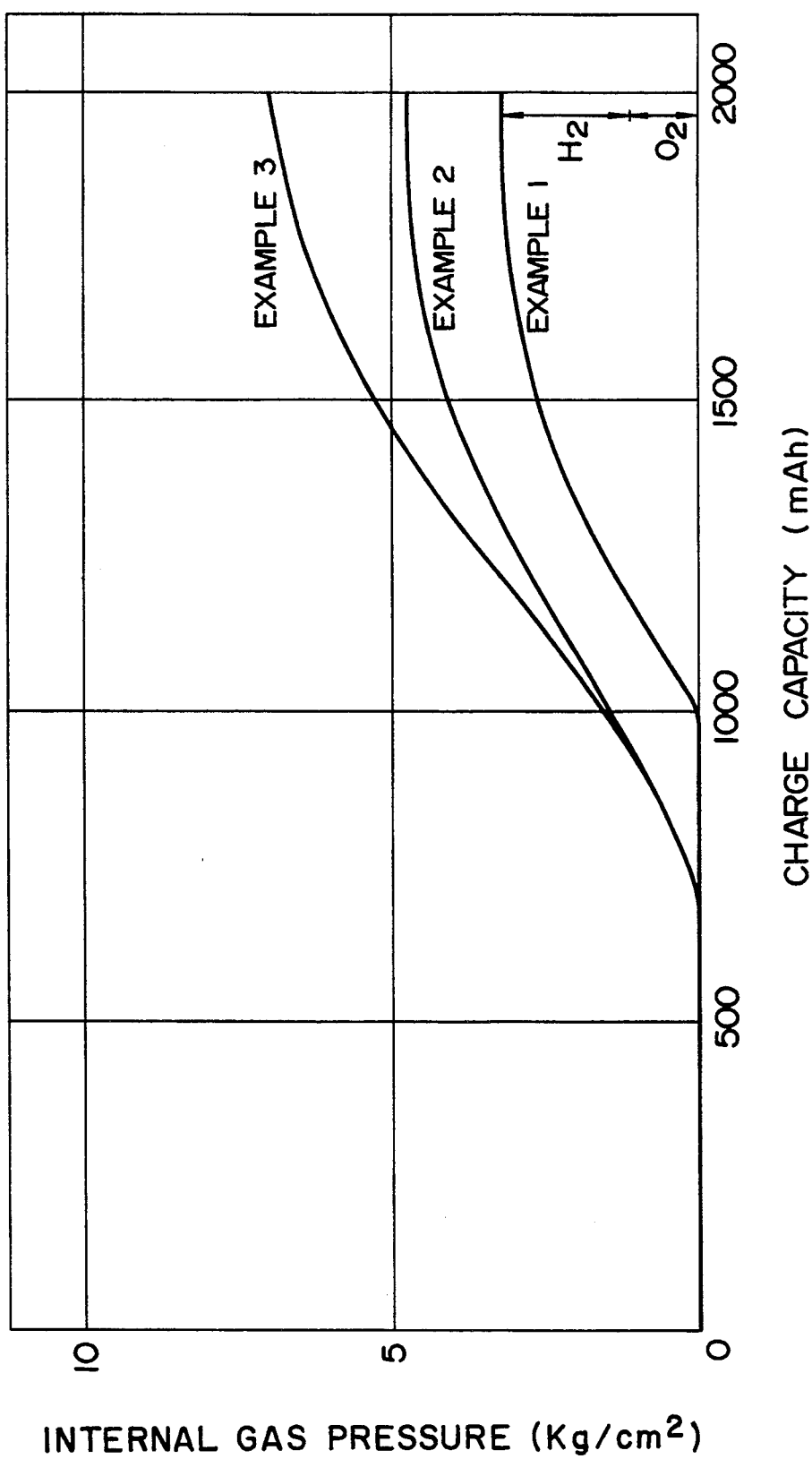
FIG. 2 is a graph view showing the relation between charge electric capacity and battery inner pressure in the case where a charging current of 1 CmA at 20° C. is respectively supplied to various hydrogen occlusion alloy negative electrodes different in construction.

The present invention will be described hereunder with respect to various examples. In the examples, the hydrogen absorbing alloy used for the negative electrode was $MmNi_{3.55}Co_{0.75}Mn_{0.4}Al_{0.3}$. Misch metal Mm (La: about 25 wt % Ce: about 52 wt %, Nd: about 18 wt %, Pr: about 5 wt %) which was a mixture of rare-earth elements was put into an arc melting furnace together with other metal samples of Ni, Co, Mn and Al. The furnace was evacuated to obtain a vacuum state of $10^{-4}$ to $10^{-5}$ torr. Then the metal samples were heated and melted by arc discharging under reduced pressure in an atmosphere of argon gas. Heat treatment was carried out at 1050° C. for 6 hours in a vacuum to homogenize the metal samples. The thus obtained alloy was ground roughly and then pulverized by a ball mill to prepare fine powder having a particle size of not larger than 38 μm.

By use of the thus prepared hydrogen absorbing alloy powder, the following, 20 kinds of hydrogen absorbing alloy negative electrodes were prepared.

EXAMPLE 1

An aqueous solution of poly(vinyl alcohol) (hereinafter referred to as "PVA") which was a hydrophilic resin was mixed, in an amount of PVA of 0.15 wt %, into the hydrogen absorbing alloy powder to form a paste. A foamed nickel porous matrix having a porosity of 95% was filled with the thus prepared paste and pressed. Then FEP resin powder was applied, in an amount of 0.8 mg/cm² onto both surfaces of the negative electrode of the thus prepared foamed nickel porous matrix to thereby obtain the negative electrode containing PVA in the inside thereof and having mainly a hydrophobic resin disposed on the surfaces thereof.

EXAMPLE 2

Only water was added to the aforementioned hydrogen absorbing alloy powder to form a paste. A foamed nickel porous matrix having a porosity of 95% was filled with the thus prepared paste and pressed. Then, "FEP" was applied, in an amount of 0.8 mg/cm², onto the surfaces of the negative electrode. Thus, a hydrogen absorbing alloy negative electrode in which such a hydrophobic resin was disposed on the surfaces of the negative electrode but no hydrophilic resin was contained in the inside of the negative electrodes was obtained.

EXAMPLE 3

Ethyl alcohol was added to a mixture of 97 wt % hydrogen absorbing alloy powder and 3 wt % FEP to form a paste. A foamed nickel porous matrix having a porosity of 95% was filled with the thus prepared paste and pressed. Thus, a hydrogen absorbing alloy electrode having the hydrophilic resin on the surfaces and inside thereof was prepared. These were respectively cut into AA battery size (39 mm × 80 mm × 0.5 mm) to prepare negative electrode plates having a charge/discharge capacity of 1600 mAh and a porosity of 30 vol %.

In examples 4 to 20 the cases where negative electrodes are prepared in the same manner as the Example 1, unless otherwise specified.

EXAMPLE 4

A hydrogen absorbing alloy negative electrode constituted by the aforementioned hydrogen absorbing alloy having a mean particle diameter of 0.1 μm was prepared.

EXAMPLE 5

A hydrogen absorbing alloy negative electrode constituted by the aforementioned hydrogen absorbing alloy having a mean particle diameter of 75 μm was prepared.

EXAMPLE 6

A hydrogen absorbing alloy negative electrode formed by dipping the hydrogen absorbing alloy powder into an alkaline solution to thereby roughen the surfaces of the hydrogen absorbing alloy particles was prepared.

EXAMPLE 7

A hydrogen absorbing alloy negative electrode coated with polyethylene as a hydrophobic resin was prepared.

EXAMPLE 8

A hydrogen absorbing alloy negative electrode coated with polytetrafluoroethylene (hereinafter referred to as "M-12") having a permeability coefficient for an oxygen/hydrogen gas, of not smaller than $1 \times 10^{-9}$ cm$^2$/sec.atm was prepared.

EXAMPLE 9

A hydrogen absorbing alloy negative electrode coated with a hydrophobic resin by dipping the alloy powder into a solution of an FEP dispersion (hereinafter referred to as "ND-1") containing a surface active agent was prepared.

EXAMPLE 10

A hydrogen absorbing alloy negative electrode coated with polyvinylidene fluoride (hereinafter referred to as "VDF") powder as a hydrophobic resin was prepared.

EXAMPLE 11

A hydrogen absorbing alloy negative electrode coated with FEP in an amount of 0.1 mg/cm$^2$ was prepared.

EXAMPLE 12

A hydrogen absorbing alloy negative electrode coated with FEP in an amount of 2 mg/cm$^2$ was prepared.

EXAMPLE 13

A hydrogen absorbing alloy negative electrode coated with a 2:1 (weight proportion) mixture of platinum black capable of catalyzing the decomposition of hydrogen and FEP, in an amount of 2.4 mg/cm$^2$, was prepared.

EXAMPLE 14

A hydrogen absorbing alloy negative electrode coated with platinum black in an amount of 1.6 mg/cm$^2$ and then coated with FEP in an amount of 0.8 mg/cm$^2$, was prepared.

EXAMPLE 15

A hydrogen absorbing alloy negative electrode coated with a 4:1 (weight proportion) mixture of LaNi$_4$Al and FEP in an amount of 4.0 mg/cm$^2$, was prepared.

EXAMPLE 16

A hydrogen absorbing alloy negative electrode coated with a 1:1 (weight proportion) mixture of acetylene black as an electrically conductive matter and FEP, in an amount of 1.6 mg cm$^2$, was prepared.

EXAMPLE 17

A hydrogen absorbing alloy negative electrode containing a hydrophilic resin in an amount of 1.5 wt % in the inside of the electrode, was prepared.

EXAMPLE 18

A hydrogen absorbing alloy negative electrode formed of an electrode plate having a porosity of 15 vol % was prepared.

EXAMPLE 19

A hydrogen absorbing alloy negative electrode prepared by the steps of: filling a foamed nickel porous matrix with paste consisting of mixture of the hydrogen absorbing alloy powder and PVA in an amount of 0.15% by weight of the alloy powder; applying FEP on the surface of the foamed nickel porous matrix; and pressing the foamed nickel porous matrix to obtain a predetermined thickness, was prepared.

EXAMPLE 20

A hydrogen absorbing alloy negative electrode coated with FEP in an amount of 0.8 mg/cm$^2$ by dipping a negative electrode plate into a dispersion solution prepared by dispersing FEP powder into an aqueous solution of 1.5 wt % PVA, was prepared.

A negative electrode 1 selected from those twenty kinds of negative electrodes and a nickel positive electrode 2 prepared by filling a known foamed nickel matrix with nickel hydroxide were inserted into a case 4 acting as a negative electrode terminal while the negative electrode 1 and the positive electrode 2 were wound spirally through a separator 3 formed of polyamide non-woven fabric. Then an alkaline electrolytic solution in a predetermined amount was injected into the case 4 and sealed to prepare a closed nickel-hydrogen storage battery of 1000 mAh AA size. The structure of the thus prepared battery is shown in FIG. 1, in which a safety vent 6 provided in the inner side of a positive electrode cap 5 is set so as to be actuated by a pressure of not lower than 30 kg/cm$^2$ for the purpose of measuring the inner pressure of the battery, though, in general, such a safety vent is often set so as to be actuated by a pressure of 11 to 12 kg/cm$^2$. In the drawing, the reference numeral 7 designates a sealing plate, 8 designates an insulating gasket, and 9 designates a positive electrode collector for electrically connecting the positive electrode 2 to the sealing plate 7. The battery having a 1 mm$\phi$ through a hole formed in the bottom portion of the battery case was fixed on a fixing apparatus and the inner pressure of the battery was measured with a pressure sensor attached to the fixing apparatus. In the measurement of the inner pressure of the battery, charging was carried out at each of various charging rates in a range of not larger than 2 CmA until the battery had been charged to 200% of the positive electrode capacity, and the inner pressure of the battery measured at that time was defined as the battery inner pressure at that charging rate. On the other hand, gases generated in the battery were collected by an aquatic substitution method and the gas composition was analyzed by means of gas chromatography.

In a test of discharging characteristic, the battery was charged to 150% of the positive electrode capacity with a charging current of 1 CmA in a circumstance of 20° C., and then continuously discharged to 0.8 V with a discharging current of 3 CmA.

FIG. 2 shows the charge of the battery inner pressure relative to the charged capacity in the case where each of the batteries respectively including the hydrogen absorbing alloy negative electrodes of the Examples 1, 2 and 3 was charged to 200% of the positive electrode capacity with a charging current of 1 CmA. As shown in FIG. 2, the battery inner pressure upon completion of charging to 2000 mAh was 3.3 kg/cm$^2$ in the case of the Example 1, 4.8 kg/cm$^2$ in the case of the Example 2, and 7.0 kg/cm$^2$ in the case of the Example 3. In the case of the Example 1, the increase of the battery inner pressure was started from the time when the battery had been charged to about 1000 mAh. In the cases of the Examples 2 and 3, the increase of the battery inner pressure was started when the battery had been charged to about 800 mat. Through analyzing the gas composition generated in the battery upon completion of charging to 2000 mAh, the oxygen partial pressure was measured to be about 1 kg/cm² substantially equally in all of Examples 1 to 3. Accordingly, it was understood that the differences in battery inner pressure among the three kinds of batteries were caused by differences in hydrogen partial pressure.

The reason is as follows.

In the nickel-hydrogen storage battery designed to have a high-capacity, for example, of 1000 mAh in AA size, as shown in the present experiment, the balance of the negative electrode capacity (1600 mAh) against the positive electrode capacity (1000 mAh) is not so sufficient that a reaction represented by the following equations (5) to (8) progresses on the hydrogen absorbing alloy negative electrode in charging the battery.

$$M + H_2O + e^- \rightarrow MH + OH^- \quad (5)$$

$$H_2O + e^- \rightarrow \tfrac{1}{2}H_2 + OH^- \quad (6)$$

$$M + \tfrac{1}{2}H_2 \rightarrow MH \quad (7)$$

$$MH + \tfrac{1}{4}O_2 \rightarrow M + \tfrac{1}{2}H_2O \quad (8)$$

In the equations, M represents a hydrogen absorbing alloy. In short, the hydrogen absorbing reaction represented by the equation (5) and the hydrogen generation reaction represented by the equation (6) occur competitively in a portion of the negative electrode wetted by the electrolytic solution. Further, the reaction of the consumption of an oxygen gas generated from the positive electrode, represented by the equation (8), occurs in the wetted portion at the same time. On the contrary, the reaction (7) of absorbing a hydrogen gas generated according to the equation (6) in the form of a gas progresses in another portion of the negative electrode which is not wetted by the electrolytic solution. The hydrophobic resin FEP acts to control the area of the hydrophobic portion on the hydrogen absorbing alloy negative electrode. It is apparent from the results of the Examples 2 and 3 that the addition of the hydrophobic resin to the surface of the negative electrode is more effective than addition thereof to the inside of the negative electrode, and that the reaction of the equation (7) occurs mainly on the surface of the negative electrode. Comparing those examples, Examples 2 and 3 are inferior in wetting property of the hydrogen absorbing alloy negative electrode for the electrolytic solution because of the addition of the hydrophobic resin. Accordingly, in Examples 2 and 3, the effective surface area in the electrochemical reaction decreases, so that the charging current density increases to accelerate the hydrogen gas generation reaction of the equation (6) to make the rising of the battery inner pressure early and to increase the battery inner pressure rapidly. To solve this problem, PVA, which is a hydrophilic resin, was added to the inside of the electrode in Example 1. As the result, the wetting property of the inside of the hydrogen absorbing alloy negative electrode particularly for the electrolytic solution was improved. As compared with Examples 2 and 3, the Example 1 had an advantage in the point as follows. The charging current density was reduced by the increase of the effective surface area in the electrochemical reaction, so that the hydrogen gas generation reaction of the equation (6) was suppressed to delay the rising of the battery inner pressure to thereby reduce the battery inner pressure. For the aforementioned reason, in Example 1 the increase of the battery inner pressure can be suppressed even in the case where the battery is charged rapidly with a charging current of 1 CmA.

Figure 3:
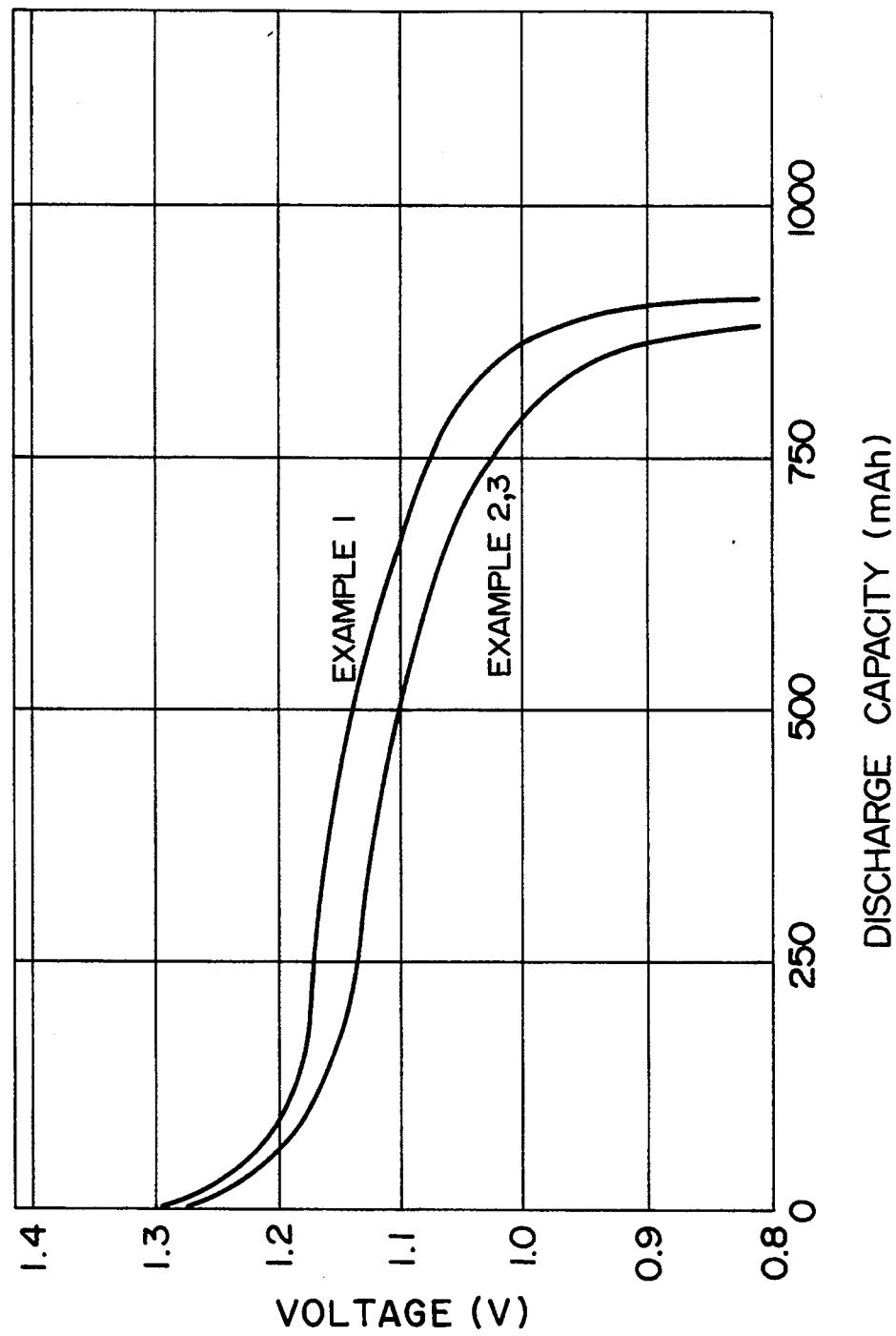
FIG. 3 is a graph view showing the relation between the discharge electric capacity and the battery voltage in the case where a discharging current of 3 CmA at 20° C. is respectively supplied to various hydrogen absorbing alloy negative electrodes different in construction.

FIG. 3 shows discharging curves in the cases where the three kinds of batteries of the respective Examples 1 to 3 were discharged with a discharging current of 3 CmA under the condition of 20° C. In FIG. 3, the battery voltage at an intermediate point of the discharge capacity when the battery has been discharged to 0.8 V is defined as an intermediate voltage for indicating the difference among the discharging voltages of the batteries.

Comparing the examples, the respective discharge capacities of the batteries are not different but the intermediate voltages are remarkably different. In Example 1, the intermediate voltage was 1.150 V. In each of the Example 2 and 3, the intermediate voltage was 1.100 V. In short, the difference between the intermediate voltages of Example 1 and each of Examples 2 and 3 was 50 mV.

The reason is as follows. In Examples 1, the wetting property of the inside of the negative electrode for the electrolytic solution was improved because hydrophilic resin PVA was added to the inside of the hydrogen absorbing alloy negative electrode. Accordingly, in Example 1, the effective surface area in the electrochemical reaction increased to reduce the discharging current density as compared with Examples 2 and 3, so that the discharge intermediate voltage increased.

For the aforementioned reason, in Example 1 the voltage drop in high-efficiently discharging could be prevented.

Table 1 shows the battery inner pressures in the cases where the batteries respectively having the twenty kinds of hydrogen absorbing alloy negative electrodes of Examples 1 to 20 were charged with a charging current of 1 CmA to 200% of the positive electrode capacity, and the intermediate voltages in the cases where the batteries were continuously discharged to 0.8 V with a discharging current of 3 CmA at 20° C.

TABLE 1

|  | Battery Inner Pressure (Kg/cm²) 1 | Intermediate Voltage (V) 1 |
| --- | --- | --- |
| Example 1 | 3.3 | 1.150 |
| Example 2 | 4.8 | 1.100 |
| Example 3 | 7.0 | 1.100 |
| Example 4 | 25.4 | 1.125 |
| Example 5 | 3.3 | 1.080 |
| Example 6 | 3.3 | 1.180 |
| Example 7 | 15.4 | 1.148 |
| Example 8 | 5.6 | 1.140 |
| Example 9 | 20.4 | 1.150 |
| Example 10 | 7.0 | 1.153 |
| Example 11 | 8.3 | 1.162 |
| Example 12 | 6.6 | 1.105 |
| Example 13 | 2.5 | 1.165 |
| Example 14 | 1.8 | 1.170 |
| Example 15 | 2.4 | 1.162 |
| Example 16 | 2.3 | 1.200 |
| Example 17 | 8.4 | 1.155 |
| Example 18 | 14.3 | 1.125 |
| Example 19 | 11.2 | 1.151 |

TABLE 1-continued

| | Battery Inner Pressure (Kg/cm$^2$) 1 | Intermediate Voltage (V) 1 |
|---|---|---|
| Example 20 | 3.5 | 1.175 |

The effect of the particle diameter of the hydrogen absorbing alloy powder to the performance of the battery in Examples 4 and 5 was examined as follows. Referring to Table 1, the battery inner pressure was increased to 25.4 kg/cm$^2$ when the mean particle diameter of the hydrogen absorbing alloy powder was 0.1 μm. The reason is that the surface of the alloy is oxidized more easily as the mean particle diameter of the hydrogen absorbing alloy is reduced, so that the polarity of the hydrogen absorbing alloy negative electrode increases to accelerate generation of a hydrogen gas in charging the battery. On the contrary, when the mean particle diameter of the hydrogen absorbing alloy increases to 75 μm as shown in Example 5, the true electrode surface decreases compared with Example 1. Accordingly, the intermediate voltage in Example 5 is reduced by 70 mV compared with Example 1. It is apparent from the above description that the preferred range of the mean particle diameter of the hydrogen absorbing alloy is from 1 to 50 μm.

In Example 6, that is to say, in the case where a negative electrode formed by dipping hydrogen absorbing alloy particles into an alkaline solution to roughen the surfaces of the particles was used, the battery inner pressure in charging the battery was not different from that in Example 1 but the intermediate voltage in discharging the battery was increased by 30 mV. As the result, it is preferable that the particles of the hydrogen absorbing alloy powder have uneven layers in the surfaces thereof.

In Examples 7 to 10, the hydrophobic resin added to the surface of the hydrogen absorbing alloy negative electrode was examined as follows. In each of Example 7 in which polyethylene was disposed on the surface of the negative electrode, Example 8 in which M-12 having a permeability coefficient of $1 \times 10^{-9}$ cm$^2$/sec atm for a hydrogen gas was disposed, Example 9 in which ND-1 as a FEP dispersion containing a surface active agent in a solution was disposed, and Example 10 in which VDF was disposed, the battery inner pressure in charging the battery was increased compared with Example 1.

This is because the hydrophobic degree of the resin in each of Examples 7 and 10 was smaller than that of FEP, so that a solid-gas interface sufficient for absorbing of a hydrogen gas could not be formed on the hydrogen absorbing alloy negative electrode.

In Example 8, the solid-gas interface could be formed sufficiently on the hydrogen absorbing alloy negative electrode. However, Example 8 was inferior in the permeability of the negative electrode for a hydrogen gas generated by the electrochemical reaction, so that the battery inner pressure in Example 8 increased. In the case where the hydrogen absorbing alloy negative electrode was coated with a hydrophobic resin having a small permeability coefficient for oxygen gas, the battery inner pressure in charging the battery increased in the same manner as described above. In this case, from analyzing the gas composition, it was found that the proportion of oxygen increased compared with Example 1. This is because the capacity of reducing an oxygen gas was reduced since the negative electrode was inferior in permeability for an oxygen gas.

In Example 9, the solid-gas interface could be formed sufficiently on the hydrogen absorbing alloy negative electrode in the same manner as in Example 7 and 10, because the surface active agent existing in the solvent of ND-1 was absorbed on FEP so that the negative electrode had an insufficient capacity of absorbing a hydrogen gas.

From the point of view of the structure of the battery safety vent or from the point of view of the strength of the battery case, it is preferable that the battery inner pressure in charging the battery is not higher than 5 kg/cm$^2$. Accordingly, the conditions of preferred hydrophobic material to be disposed on the surface layer of the hydrogen absorbing alloy negative electrode are as follows.

(1) The material is selected from fluorocarbon polymers;
(2) The permeability coefficient for an oxygen gas or 2 hydrogen gas is not smaller than $1 \times 10^{-8}$ cm$^2$/sec atm at 25° C.;
(3) When a dispersion is used, no surface active agent is contained in the solvent; and
(4) The material is tetrafluoroethylene fluorocarbon polymers or tetrafluoroethylene-hexafluoropropylene copolymer resin.

Figure 4:
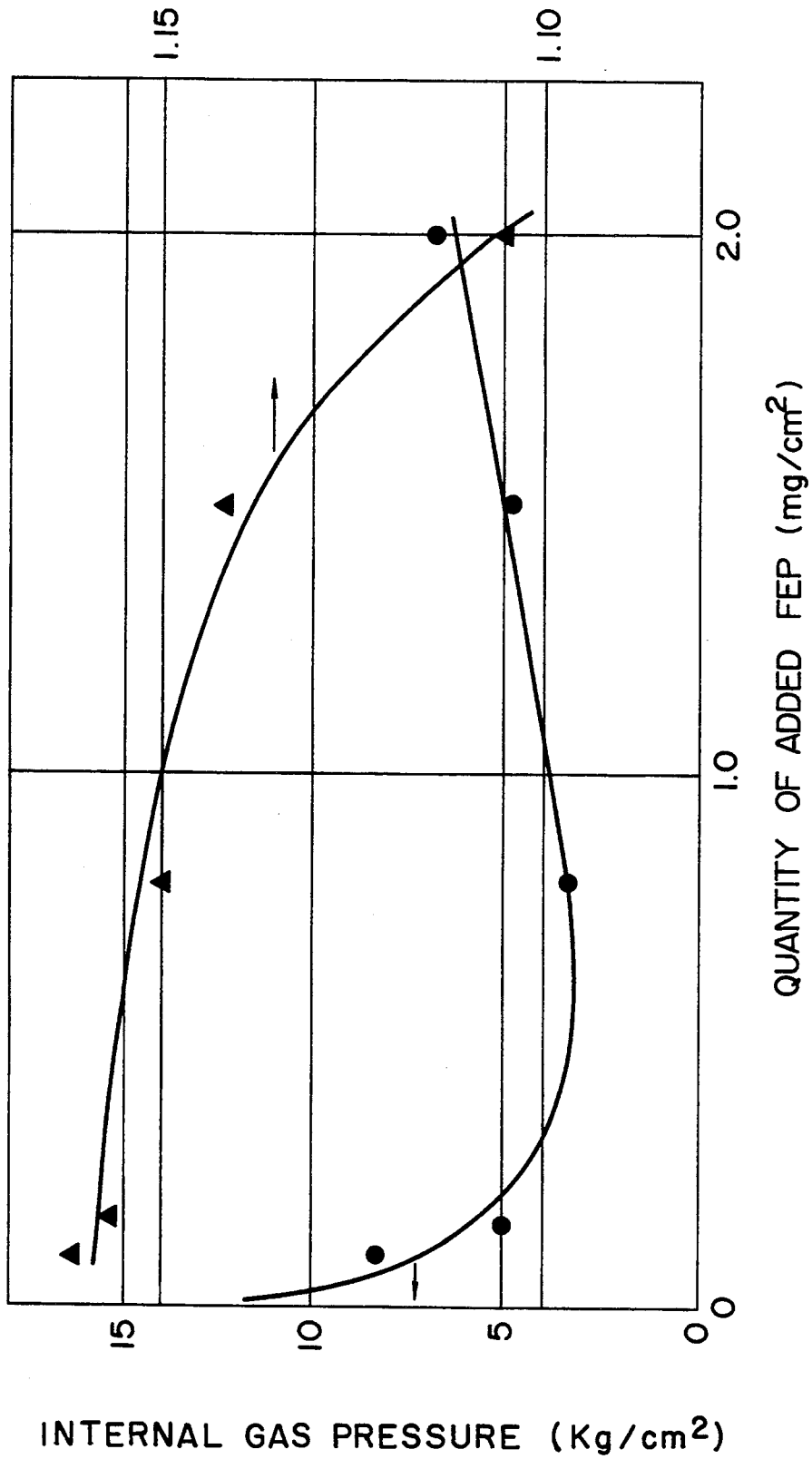
FIG. 4 is a graph view showing the relations among the quantity of copolymer powder of tetrafluoroethylene-hexafluoropropylene (hereinafter referred to as "FEP") to be added, the battery inner pressure in the case where the battery is charged by 200% with respect to the positive electrode capacity with a charging current of 1 CmA at 20° C., and the intermediate voltage in the case where the battery is discharged to 0.8 V with a discharging current of 3 CmA at 20° C.

In Examples 11 and 12, the quantity of the hydrophobic resin to be added to the surface layer of the hydrogen absorbing alloy negative electrode was examined as follows. In Example 11, when the quantity of FEP (fluorinated ethylene-propylene resin) to be added was 0.1 mg/cm$^2$, the battery inner pressure in charging the battery was increased to 8.3 kg/cm$^2$. In Example 12, when the quantity of FEP to be added was 2 mg/cm$^2$, the intermediate voltage in discharging the battery was reduced to 1.105 V because FEP acts as an insulating material to thereby increase the polarization of the hydrogen absorbing alloy negative electrode in discharging the battery. FIG. 4 shows the relations among the quantity of FEP to be added, the battery inner pressure in charging the battery and the intermediate voltage in discharging the battery. It is apparent from FIG. 4 that an optimum value exists in the quantity of FEP to be added. Accordingly, from the double viewpoint of the battery inner pressure in charging the battery and the intermediate voltage in discharging the battery, it is preferable that the hydrophobic resin is added to the surface layer of the hydrogen absorbing alloy negative electrode in an amount in the range of from 0.15 mg/cm$^2$ to 1.5 mg/cm$^2$.

In Examples 13 and 14, the effects from the addition of a material capable of catalyzing the decomposition of a hydrogen gas, to the surface of the hydrogen absorbing alloy negative electrode and the method of addition thereof were examined. In Example 13, the battery used a hydrogen absorbing alloy negative electrode coated with a mixture of platinum black capable of catalyzing the decomposition of a hydrogen gas and FEP acting as a hydrophobic material. In Example 14, the battery used a hydrogen absorbing alloy negative electrode coated with platinum black and then coated with FEP. Referring to Table 1, in any case, the inner battery pressure in charging the battery decreased and the intermediate voltage in discharging the battery increased, compared with the battery of Example 1 using the hydrogen absorbing alloy negative electrode in which FEP is provided mainly on the surfaces thereof. This is because, by the addition of platinum black, the reaction of an absorbing hydrogen gas onto the hydrogen absorbing alloy electrode as represented by the equation (7) was accelerated in charging the battery and the reaction of desorbing hydrogen from the hydrogen absorbing alloy was accelerated in discharging the battery. Although the examples have shown the case where platinum black was used as a material capable of catalyzing the decomposition of a hydrogen gas, it is a matter of course that the invention is not limited to the specific examples and that the material may be selected from the group of platinum, palladium and palladium black. In fact, the same excellent result could be obtained by using the aforementioned materials.

The effect by arranging the hydrogen absorbing alloy powder having a hydrogen equilibrium pressure lower than that of $MmNi_{3.55}Mn_{0.1}Al_{0.3}Co_{0.75}$, in the surface of the hydrogen absorbing alloy negative electrode was examined with reference to Example 15. The hydrogen equilibrium pressure of $MmNi_{3.55}Mn_{0.1}Al_{0.3}Co_{0.75}$ is about 0.4 kg/cm$^2$ at 20° C., whereas the hydrogen equilibrium pressure of $LaNi_4Al$ disposed in the surface of the negative electrode is about $1.8 \times 10^{-3}$ kg/cm$^2$ at 20° C. In this example, the battery inner pressure in charging the battery was 2.4 kg/cm$^2$. The value of the inner pressure was excellent compared with the value of 3.3 kg/cm$^2$ obtained in Example 1. This is because the hydrogen gas absorbing reaction of the equation (7) on the negative electrode is apt to progress since the hydrogen equilibrium pressure of $LaNi_4Al$ is lower than that of $MmNi_{3.55}Mn_{0.1}Al_{0.3}Co_{0.75}$. The effect by $LaNi_4Al$ was obtained both in the case where it was disposed in the surface of the hydrogen absorbing alloy and in the case where it was disposed in the hydrophobic layer of the negative electrode surface. Although this embodiment has shown the case where $LaNi_4Al$ was used as a hydrogen absorbing alloy to be added to the negative electrode surface, it is to be understood that any suitable hydrogen absorbing alloy may be used as long as the hydrogen equilibrium pressure of the alloy is lower than that of $MmNi_{3.55}Mn_{0.1}Al_{0.3}Co_{0.75}$.

The effect from the addition of the electrically conductive material to the hydrophobic layer of the hydrogen absorbing alloy negative electrode was examined with reference to Example 16. In Example 16, the battery inner pressure in charging the battery was 2.3 kg/cm$^2$ and the intermediate voltage in discharging the battery was 1.200 V. The values thus obtained in Example 16 were excellent compared with Example 1. This is because the electron conductivity of the hydrogen absorbing alloy negative electrode was improved by the addition of the electrically conductive material to thereby reduce the polarization of the hydrogen absorbing alloy negative electrode both in charging the battery and in discharging the battery. Although Example 16 has shown the case where acetylene black was used as an electrically conductive material, the same effect could be obtained in the case where the electrically conductive material was selected from the group of amorphous-structure carbon such as carbon black, ketene black and the like, or graphite having a graphitization structure and the like. Further, when expansive graphite was used, adhesion of FEP to the negative electrode was improved, so that the charge/discharge cycle lifetime was improved.

Figure 5:
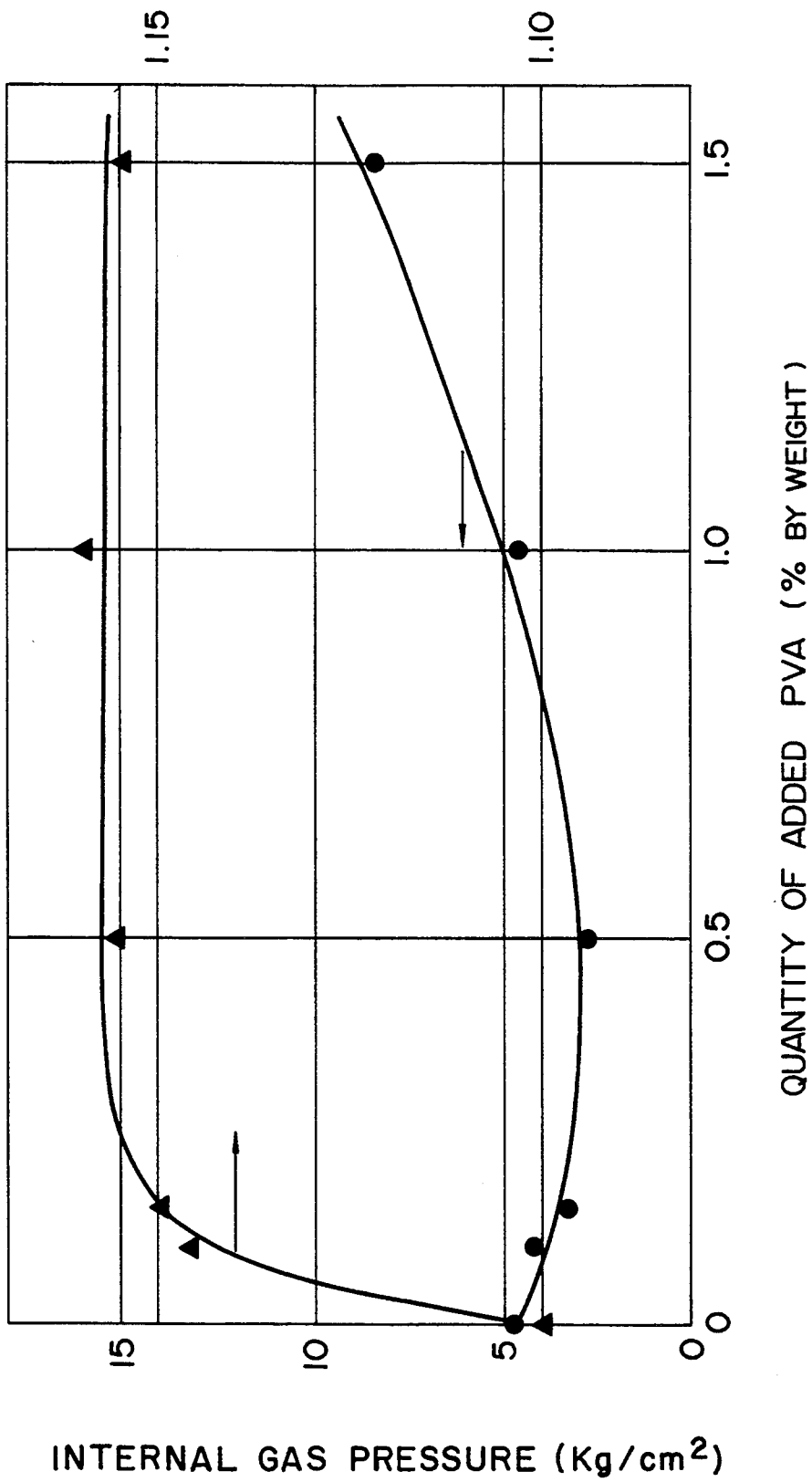
FIG. 5 is a graph view showing the relations among the quantity of PVA to be added, the battery inner pressure in the case where the battery is charged by 200% with respect to the positive electrode capacity with a charging current of 1 CmA at 20° C., and the intermediate voltage in the case where the battery is discharged to 0.8 V with a discharging current of 3 CmA at 20° C.

The quantity of the hydrophilic resin to be contained in the inside of the hydrogen absorbing alloy negative electrode was examined as follows. Example 17 relates to a battery using a hydrogen absorbing alloy negative electrode containing PVA, which is a hydrophilic resin, in an amount ten times the amount in Example 1. Referring to Table 1, the discharging characteristic was not improved though a large amount of the hydrophilic resin was added, and the battery inner pressure in charging the battery increased to 8.4 kg/cm$^2$. In general, the relative quantity of the hydrogen absorbing alloy power decreases as the quantity of PVA increases. Accordingly, the addition of a large quantity of PVA is not preferable from the point of view of high energy density of the hydrogen absorbing alloy negative electrode. On contrary, Example 2 in which no PVA is added is not preferable from the point of view of charging/discharging characteristics. FIG. 5 shows the relations among the quantity of PVA to be added, the battery inner pressure in charging the battery and the intermediate voltage in discharging the battery. From the results of FIG. 5 and from the point of view of high energy density of the hydrogen absorbing alloy negative electrode, the optimum quantity of PVA to be added is in the range of from 0.05 to 1.0% by the weight of the hydrogen absorbing alloy. Although the example has shown the case where PVA was used as a hydrophilic material, it is a matter of course that the invention is not limited to the specific example. The same effect could be obtained in the case where the hydrophilic material was selected from other alkali-resisting resins such as carboxymethyl cellulose.

The porosity of the hydrogen absorbing alloy negative electrode was examined as follows. In Example 18 in which the porosity of the hydrogen absorbing alloy negative electrode was established to be 15 vol %, the battery inner pressure in charging the battery was 14.3 kg/cm$^2$. The hydrogen gas absorption capacity of the battery of Example 18 was reduced compared with that of the battery of Example 1 in which the porosity of the hydrogen absorbing alloy negative electrode was established to be 30 vol %. The reason is as follows. Example 18 was inferior in the wetting property of the inside of the electrode for the electrolytic solution because the porosity of the hydrogen absorbing alloy negative electrode was no more than 15 vol %. As the result, the electrochemical hydrogen absorbing reaction of the equation (5) was suppressed and the hydrogen gas generation of the equation (7) was accelerated. Further, the intermediate voltage in discharging the battery was reduced compared with Example 1, because the wetting property of the electrode was deteriorated. On the contrary, when the porosity of the hydrogen absorbing alloy is increased, the charging/discharging characteristics are improved. However, the increase of the porosity is not preferable from the point of view of high energy density of the hydrogen absorbing alloy negative electrode and battery. Accordingly, the preferred porosity of the hydrogen absorbing alloy negative electrode is in the range of from 20 to 40 vol %.

The method of addition of the hydrophobic material to the surface of the hydrogen absorbing alloy negative electrode was examined as follows. Example 1 relates to a battery using a negative electrode formed by the steps of: mixing hydrogen absorbing alloy powder and an aqueous solution of PVA to prepare paste; filling a foamed nickel porous matrix as a three-dimensional supporting matrix with the paste; pressing the supporting matrix containing the paste; and applying FEP to the surface of the negative electrode. On the other hand, Example 19 relates to a battery using a negative electrode formed by pressing the supporting matrix after applying FEP to the surface of the supporting matrix containing the paste. It was apparent from Table 1 that the battery inner pressure in charging the battery in Example 19 was increased to 11.2 kg/cm$^2$ compared with Example 1. This is because FEP in Example 19 was distributed into the inside of the hydrogen absorbing alloy negative electrode by pressing the supporting matrix, so that the hydrophilic property of the inside of the hydrogen absorbing alloy negative electrode was deteriorated and the electrochemical hydrogen absorbing reaction of the equation (5) was suppressed to thereby accelerate generation of a hydrogen gas in charging the battery. For the reason, the preferred method of producing a hydrogen absorbing alloy negative electrode is the method like Example 1 comprising the steps of: mixing hydrogen absorbing alloy powder and an aqueous solution of PVA to prepare paste; applying the paste to a supporting matrix through selected one of filling, injecting, and smearing and then pressing the support to thereby dispose the hydrophilic material in the inside of the electrode; and applying FEP to the surface thereof by selected one of smearing, dipping and injecting to thereby dispose the FEP mainly in the vicinity of the surface thereof. This hydrogen absorbing alloy negative electrode production method can be applied to the case where the surface of the hydrogen absorbing alloy negative electrode contains a material capable of catalyzing the decomposition of a hydrogen gas, an electrically conductive material and hydrogen absorbing alloy powder having a hydrogen equilibrium pressure lower than that of MmNi$_{3.55}$Mn$_{0.4}$Al$_{0.3}$Co$_{0.75}$. In this case, similarly, it is preferable that the supporting matrix containing the paste consisting of hydrogen absorbing alloy powder and an aqueous solution of PVA is pressed, and thereafter the aforementioned materials and/or mixtures of the materials and FEP are applied to the surface of the hydrogen absorbing alloy negative electrode through selected one of smearing, dipping and injecting.

Example 20 relates to a battery using a negative electrode prepared by the steps of: filling a supporting matrix with paste consisting of hydrogen absorbing alloy powder and an aqueous solution of PVA; pressing the supporting matrix to prepare a hydrogen absorbing alloy negative electrode; and adding FEP to the surface of the negative electrode through dipping the negative electrode into a PVA aqueous solution containing FEP. The charging/discharging characteristics of the battery of Example 20 were as follows. The battery inner pressure in charging the battery was 3.5 kg/cm$^2$ and the intermediate voltage in discharging the battery was 1.175 V. It is apparent from comparison with Example 1 that the discharging characteristic of the battery of Example 20 has been improved. Further, the inner pressure of the battery using the negative electrode of Example 20 was not deteriorated even in the case where charge/discharge was repeated over 500 cycles. This is because FEP is fixed firmly to the vicinity of the surface of the negative electrode by poly(vinyl alcohol). As described above, another preferred method of producing a hydrogen absorbing alloy negative electrode according to the invention may comprises the steps of: mixing hydrogen absorbing alloy powder and an aqueous solution of PVA to prepare paste; applying the paste to a supporting matrix through selected one of filling, dipping and injecting; pressing the supporting matrix; and applying a mixture of a hydrophilic material and a hydrophobic material to the surface of the supporting matrix through selected one of smearing, dipping and injecting.

It is to be understood that poly(vinyl alcohol) may be replaced by one of other alkali-resisting resins such as carboxymethylcellulose and methylcellulose and the same effect can be obtained by the other alkali-resisting resins.

A further battery was prepared as follows. A mixture of FEP and polyethylene at a weight ratio of 2:1 was applied to the surface of the hydrogen absorbing alloy negative electrode by an amount of FEP of 0.8 mg/cm$^2$. Then the negative electrode was heated at 120° C. for 30 minutes. The battery was prepared by using the thus prepared negative electrode. The inner pressure of the battery in charging the battery was 3.5 kg/cm$^2$ and the intermediate voltage thereof in discharging the battery was 1.150 V. Those obtained values were substantially the same as those in Example 1. However, the battery inner pressure was not deteriorated in the same manner as in Example 20 even in the case where charge/discharge was repeated over 500 cycles. This is because FEP was fixed firmly to the surface of the negative electrode by polyethylene. Polyethylene used herein may be replaced by one of thermoplastic resins, such as polypropylene, poly(vinyl chloride), ABS resin and polystyrene, having a melting point lower than that of FEP. In the case where polyethylene was replaced by one of the aforementioned thermoplastic resins, the same effect as described above was obtained. As described above, a further preferred method of producing a hydrogen absorbing alloy negative electrode according to the invention may comprises the steps of: mixing hydrogen absorbing alloy powder and an aqueous solution of PVA to prepare paste; applying the paste to a supporting matrix through selected one of filling, dipping and injecting; pressing the supporting matrix; applying a mixture of a hydrophilic material and a thermoplastic resin having a melting point lower than that of the hydrophobic material to the surface of the supporting matrix through selected one of smearing, dipping and injecting; and heating the supporting matrix at a temperature at which the thermoplastic resin is melted but the hydrophobic material is not melted.

With respect to Examples 1 to 20, substantially the same results were obtained even in the case where the composition of the hydrogen absorbing alloy was changed within the range represented by the general formula $A_{1-x}B_xC_y$. However, when MmNi$_5$ was used as a hydrogen absorbing alloy having a CaCu$_5$-type crystalline structure, pulverization of hydrogen absorbing alloy particles progressed by repeating the charge/discharge cycle, so that the particles were dropped out of the electrode supporting matrix and the discharge capacity was reduced to deteriorate the cycle lifetime of the battery. To solve the problem, at least one metal selected from the group consisting of Ti, Zr, Ca, Y, Hf, Co, Mn, Al, Fe, Cu and Cr was added to MmNi$_5$ to prepare a multicomponent alloy. The progress of pulverization of hydrogen absorbing alloy particles by repeating the charge/discharge cycle was suppressed by the multicomponent alloy, so that the cycle lifetime characteristic of the battery was improved. However, when Ti, Zr, Ca, Y or Hf was added an amount of not smaller than 0.2 atomic ratio, when Co or Cu was added in an amount of not smaller than 1.0 atomic ratio, when Fe or Cr was added in an amount of not smaller than 0.3 atomic ratio, when Mn was added in an amount of not smaller than 0.6 atomic ratio or when Al was added in an amount of not smaller than 0.5 atomic ratio, the alloy phase effective for absorbing hydrogen was reduced so that the discharge capacity was undesirably reduced. On the contrary, when Ni was added in an amount of not larger than 3.5 atomic ratio, the discharge capacity of the hydrogen absorbing alloy negative electrode was deteriorated in the same manner as described above. On the other hand, when the weight ratio of the hydrogen absorbing alloy was widely changed from $CaCu_5$ to $CaCu_{4.7}$ or $CaCu_{5.3}$, the discharge capacity of the hydrogen absorbing alloy negative electrode was undesirably deteriorated in the same manner as described above. As described above, the preferred hydrogen absorbing alloy used in the hydrogen absorbing alloy negative electrode is represented by the general composition formula $A_{1-x}B_xC_y$, in which A is selected from the group consisting of La, mixtures of La and rare-earth elements, and misch metals; B is selected from the group consisting of Ti, Zr, Ca, Y, Hf and mixtures thereof; x has a value within the range $0 \leq x \leq 0.2$; C is selected from the group consisting of Ni, Co, Mn, Al, Fe, Cu, Cr and mixtures thereof; and y has a value within the range $4.7 \leq y \leq 5.3$, made up as follows, $y \geq 3.5$ for Ni, $y \leq 1.0$ for Co, $y \leq 0.6$ for Mn, $y \leq 0.5$ for Al, $y \leq 0.3$ for Fe, $y \leq 1.0$ for Cu, and $y \leq 0.3$ for Cr.

Further, V was added to the aforementioned hydrogen absorbing alloy to prepare a hydrogen absorbing alloy represented by the formula $MmNi_{3.55}Co_{0.75}Mn_{0.4}Al_{0.3}V_{0.02}$. When the negative electrode of the battery was formed of this alloy, the battery inner pressure in charging the battery was 2.8 gk/cm$^2$ and the intermediate voltage in discharging the battery was 1.158 V. Thus, the battery was improved compared with Example 1. This is because the lattice constant of the hydrogen absorbing alloy was increased by addition of V thereby hydrogen can diffuse rapidly in the hydrogen absorbing alloy phase. The effect in addition of v was found when V was added in an amount of not larger than 0.02 atomic ratio. However, when V was added in an amount of not smaller than 0.3, the alloy phase effective for absorbing hydrogen was reduced so that the discharge capacity was undesirably reduced. Accordingly, it is preferable to add V in an amount in the range of from 0.02 to 0.3 atomic ratio.

Further, In was added to the aforementioned hydrogen absorbing alloy to prepare a hydrogen absorbing alloy represented by the formula $MmNi_{3.55}Co_{0.75}Mn_{0.4}Al_{0.3}In_{0.02}$. When a battery was prepared by using the alloy in the negative electrode thereof, the inner pressure of the battery in charging the battery was 2.5 kg/cm$^2$. In short, the charging characteristic of the battery was improved compared with Example 1. This is because the hydrogen overvoltage of the hydrogen absorbing alloy negative electrode in charging the battery was increased to suppress generation of hydrogen. The effect in addition of In was found when In was added in an amount of not larger than 0.02 atomic ratio. However, when In was added in an amount of not smaller than 0.1, the discharge capacity was undesirably reduced. Accordingly, it is preferable to add In in an amount in the range of from 0.02 to 0.3 atomic ratio. The same effect was obtained in the case where In was replaced by Tl or Ga.

Next, description will be made about the specific examples of the invention in which a hydrophobic agent was disposed on one surface of a separator contacting the negative electrode together with comparative examples.

EXAMPLE 21

An aqueous solution of PVA was added, in an amount of PVA of 0.2 wt %, to the above hydrogen absorbing alloy powder to form paste. A foamed nickel matrix having a porosity of 95% was filled with the paste and pressed to a predetermined thickness to thereby form a negative electrode. On the other hand, FEP was uniformly applied, in an amount of 0.5 mg/cm$^2$, onto one surface of non-woven fabric of sulfonated polypropylene arranged to be contact with the negative electrode, to thereby form a separator. A closed nickel-hydrogen storage battery was constituted by the negative electrode, the separator and the nickel positive electrode as described above.

EXAMPLE 22

A closed nickel-hydrogen storage battery having the same structure as that in Example 21 and being formed by dipping the hydrogen absorbing alloy powder into an alkaline solution to thereby roughen the surfaces of the hydrogen absorbing alloy particles was prepared.

EXAMPLE 23

A closed nickel-hydrogen storage battery using a negative electrode formed in applying platinum black in an amount of 1 mg/cm$^2$ onto the surface thereof in the same manner as in Example 21 and a separator formed in the same manner as in Example 21 was prepared.

EXAMPLE 24

A closed nickel-hydrogen storage battery formed by adding platinum black to the nickel-hydrogen storage battery prepared in Example 21, so as to be free from electrical contact between the platinum black and the positive and negative electrodes, was prepared.

COMPARATIVE EXAMPLE 1

A closed nickel-hydrogen storage battery using a negative electrode prepared in the same manner as in Example 21 and a separator formed of sulfonated polypropylene non-woven fabric being not covered with FEP was prepared.

COMPARATIVE EXAMPLE 2

A closed nickel-hydrogen storage battery using a negative electrode prepared in the same manner as in Example 21 and a separator formed by applying polyethylene resin powder (hereinafter referred to as "PE"), in 0.5 mg/cm$^2$, uniformly onto one surface of sulfonated polypropylene non-woven fabric being contact with the negative electrode was prepared.

COMPARATIVE EXAMPLE 3

A closed nickel-hydrogen storage battery using a negative electrode prepared in the same manner as in Example 21 and a separator formed by applying the above M-12 having a permeability coefficient of $1 \times 10^{-9}$ cm$^2$/sec.atm for oxygen gas and hydrogen gas, in an amount of 0.5 mg/cm$^2$, onto a surface of sulfonated polypropylene non-woven fabric being in contact with the negative electrode was prepared.

COMPARATIVE EXAMPLE 4

A closed nickel-hydrogen storage battery using a negative electrode prepared in the same manner as in Example 21 and a separator formed by applying an FEP dispersion (ND-1) including a surface active agent in a solution, in an amount of 0.5 mg/cm² calculated as solid FEP, onto a surface of sulfonated polypropylene non-woven fabric being in contact with the negative electrode was prepared.

COMPARATIVE EXAMPLE 5

A closed nickel-hydrogen storage battery using a negative electrode prepared in the same manner as in Example 21 and a separator formed by applying VDF, in an amount of 0.5 mg/cm², onto a surface of sulfonated polypropylene non-woven fabric being in contact with the negative electrode was prepared.

COMPARATIVE EXAMPLE 6

A closed nickel-hydrogen storage battery using a negative electrode prepared in the same manner as in Example 21 and a separator formed in applying FEP, in an amount of 0.05 mg/cm², uniformly onto a surface of sulfonated polypropylene non-woven fabric being in contact with the negative electrode was prepared.

COMPARATIVE EXAMPLE 7

A closed nickel-hydrogen storage battery using a negative electrode prepared in the same manner as in Example 21 and a separator formed in applying FEP, in an amount of 2.0 mg/cm², uniformly onto a surface of sulfonated polypropylene non-woven fabric being in contact with the negative electrode was prepared.

COMPARATIVE EXAMPLE 8

A closed nickel-hydrogen storage battery using a negative electrode prepared in the same manner as in Example 21 and a separator formed in applying FEP, in an amount of 0.5 mg/cm², uniformly onto a surface of polyamide non-woven fabric being in contact with the negative electrode was prepared.

COMPARATIVE EXAMPLE 9

A closed nickel-hydrogen storage battery having the same structure as in Example 21 except that the mean particle diameter of the hydrogen absorbing alloy is 0.1 μm was prepared.

COMPARATIVE EXAMPLE 10

A closed nickel-hydrogen storage battery having the same structure as in Example 21 except that the mean particle diameter of the hydrogen absorbing alloy is 75 μm was prepared.

Figure 6:
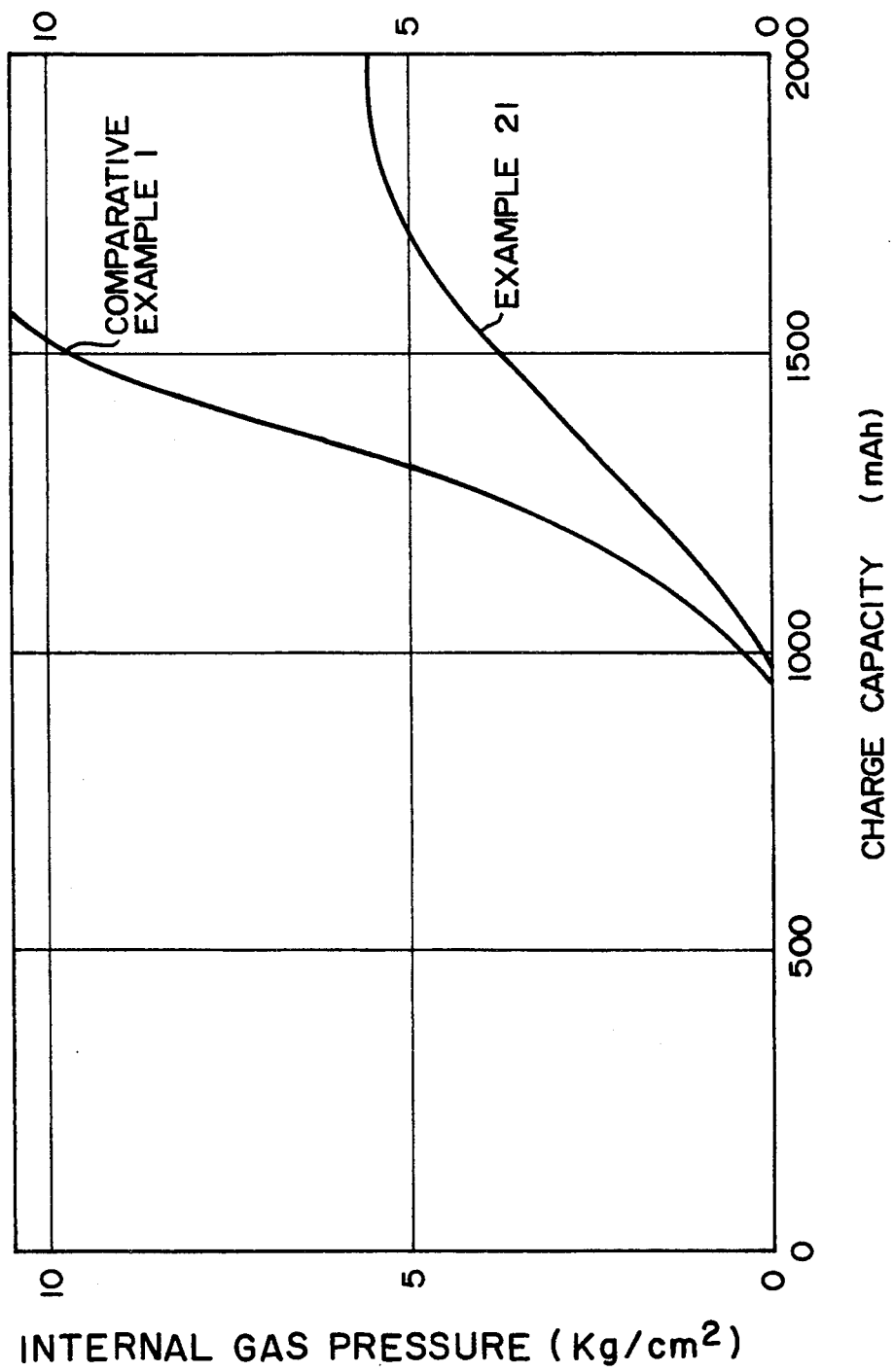
FIG. 6 is a graph view showing the relation between the charge capacity and the battery inner pressure when the battery is charged with a charging current of 1 CmA at 20° C.

FIG. 6 shows the change of the battery inner pressure relative to the charged capacity in the case where each of the closed nickel-hydrogen storage batteries of Example 21 and Comparative Example 1 was charged to 200% of the positive electrode capacity with a charging current of 1 CmA. As shown in FIG. 6, the battery inner pressure upon completion of charging to 2000 mAh was 5.5 kg/cm² in the case of Example 21. However, in the case of Comparative Example 1, the battery inner pressure upon completion of charging to 1500 mAh approached 10 kg/cm² and the battery inner pressure upon completion of charging to 2000 mAh was about 30 kg/cm².

The reasons are as follows.

In the closed nickel-hydrogen storage battery designed to have a high-capacity, for example, of 1000 mAh in AA size, as shown in the present invention, the balance of the negative electrode capacity (1600 mAh) against the positive electrode capacity (1000 mAh) is not so sufficient that a reaction represented by the equations (5) to (8) competitively progresses on the hydrogen absorbing alloy negative electrode in charging the battery.

In short, the hydrogen absorbing reaction represented by the equation (5) and the hydrogen generation reaction represented by the equation (6) occur competitively in a portion of the negative electrode wetted by the electrolytic solution. On the contrary, the reaction (7) of absorbing a hydrogen gas generated according to the equation (6) in the form of a gas and the reaction of consumption of an oxygen gas generated from the positive electrode, represented by the equation (8), occur in another portion of the negative electrode which is not wetted by the electrolytic solution.

The battery inner pressure can be reduced by suppressing the hydrogen generation reaction represented by the equation (6) and accelerating the hydrogen absorbing reaction represented by the equations (5) and (7) and the oxygen consumption reaction represented by the equation (8).

In the case of Comparative Example 1 showing a conventional battery, the amount of the electrolytic solution in the neighbor of the negative electrode is so large that the hydrogen absorbing reaction represented by the equation (7) and the oxygen consumption reaction represented by the equation (8) cannot progress sufficiently. Accordingly, in the case of Comparative Example 1, the battery inner pressure increases. On the contrary, in the case of Example 21, the battery is formed by applying FEP as a hydrophobic resin onto the separator to optimize the electrolytic solution distribution in the neighbor of the negative electrode surface being in contact with the separator, to thereby accelerate the gas consumption reaction represented by the equations (7) and (8). Accordingly, in the case of Example 21, the battery inner pressure is reduced. For the aforementioned reason, in Example 21 the increase of the battery inner pressure can be suppressed even in the case where the battery is charged rapidly with a charging current of 1 CmA.

Table 2 shows the battery inner pressures in the cases where the batteries respectively having the fourteen kinds of hydrogen absorbing alloy negative electrodes of Examples 21 to 24 and Comparative Examples 1 to 10 were charged with a charging current of 1 CmA to 200% of the positive electrode capacity, and the intermediate voltages in the cases where the batteries were continuously discharged to 0.8 V with a discharging current of 3 CmA at 20° C.

TABLE 2

| | Buttery Inner Pressure (kg/cm²) | Intermediate Voltage (V) |
|---|---|---|
| Example 21 | 5.5 | 1.15 |
| Example 22 | 5.5 | 1.18 |
| Example 23 | 3.5 | 1.15 |
| Example 24 | 4.0 | 1.15 |
| Comp. Example 1 | 30.0 | 1.16 |
| Comp. Example 2 | 17.0 | 1.15 |
| Comp. Example 3 | 10.0 | 1.14 |
| Comp. Example 4 | 26.0 | 1.13 |
| Comp. Example 5 | 9.0 | 1.14 |
| Comp. Example 6 | 9.0 | 1.16 |
| Comp. Example 7 | 7.0 | 1.13 |
| Comp. Example 8 | 5.5 | 1.15 |
| Comp. Example 9 | 25.0 | 1.18 |

TABLE 2-continued

| | Buttery Inner Pressure (kg/cm²) | Intermediate Voltage (V) |
|---|---|---|
| Comp. Example 10 | 5.5 | 1.08 |

In Comparative Examples 2 to 5, the hydrophobic resin added to the surface of the separator, as to the kind of the hydrophobic resin, was exampled as follows. As shown in Table 2, in each of Comparative Example 2 in which polyethylene (PE) was disposed on the surface of the separator, Comparative Example 3 in which M-12 having a permeability coefficient of $1\times 10^{-9}$ cm²/sec atm for a hydrogen gas was disposed, Comparative Example 4 in which ND-1 as a FEP dispersion containing a surface active agent in a solution was disposed, and Comparative Example 5 in which VDF was disposed, the battery inner pressure in charging the battery was increased compared with Example 21.

This is because the hydrophobic degree of the resin in each of Comparative Examples 2 and 5 was smaller than that of FEP and amount of the electrolytic solution in the neighbor of the negative electrode surface was larger, so that the hydrogen gas absorbing reaction and the oxygen gas consumption reaction could not progress sufficiently. In Comparative Example 3, the electrolytic solution distribution in the neighbor of the negative electrode surface was optimized but the permeability of the negative electrode for hydrogen gas generated on the negative electrode according to the reaction equation (6) and oxygen gas generated from the positive electrode was deteriorated, so that the battery inner pressure was increased.

In Comparative Example 4, the hydrogen gas absorbing reaction and the oxygen gas consumption reaction could not progress sufficiently, because the surface active agent existing in the solvent of ND-1 was absorbed on FEP so that the amount of the electrolytic solution in the neighbor of the negative electrode was excessive as in Comparative Examples 2 and 5.

From the point of view of the structure of the battery safety vent or from the point of view of the strength of the battery case, it is preferable that the battery inner pressure in charging the battery is not higher than 7 or 8 kg/cm². Accordingly, the conditions of preferred hydrophobic resin material to be disposed on one surface of the separator being in contact with the negative electrode are as follows.

(1) The material is selected from fluorocarbon polymers;
(2) The permeability coefficient for an oxygen gas or an hydrogen gas is not smaller than $1\times 10^{-8}$ cm²/sec atm;
(3) When dispersion is used, no surface active agent is contained in the solvent; and
(4) The material is polytetrafluoroethylene or tetrafluoroethylene-hexafluoropropylene copolymer resin.

In Comparative Examples 6 and 7, the quantity of the hydrophobic resin to be added to the surface of the separator being in contact with the negative electrode was examined as follows. In Comparative Example 6, when the quantity of FEP to be added was 0.05 mg/cm², the battery inner pressure in charging the battery was increased to 9.0 kg/cm². In Comparative Example 7, when the quantity of FEP to be added was 2.0 mg/cm², the battery inner pressure in charging was about 7.0 kg/cm² but the intermediate voltage in discharging was reduced to 1.13 V because FEP acts as an electrically insulating material to thereby increase the polarization in discharging.

FIG. 7 shows the relations among the quantity of FEP to be added, the battery inner pressure in charging the battery and the intermediate voltage in discharging the battery. It is apparent from FIG. 7 that an optimum value exists in the quantity of FEP to be added. Accordingly, from the double viewpoint of the battery inner pressure in charging the battery and the intermediate voltage in discharging the battery, it is preferable that the hydrophobic resin is added to the surface of the separator being in contact with the negative electrode, in an amount in the range of from 0.06 mg/cm² to 12 mg/cm².

In Comparative Example 8, the material used as the separator was examined. When the separator was constituted by polyamide non-woven fabric, the polyamide separator had the same battery inner pressure and the same discharging characteristic as the polypropylene separator but the self-discharging characteristic at high temperature was deteriorated. This tendency did not change even in the case where woven fabric was used as the separator.

As a result, it is preferable that the separator is selected from polypropylene woven fabric and polypropylene non-woven fabric.

In Comparative Examples 9 and 10, the particle size of the hydrogen absorbing alloy was examined. In Comparative Example 9, when the mean particle diameter of the hydrogen absorbing alloy was 0.1 μm, the battery inner pressure was increased to 25.0 kg/cm². This is because as the mean particle diameter of the hydrogen absorbing alloy decreased, the surface of the alloy became oxidized easily, so that the polarization of the hydrogen absorbing alloy negative electrode in charging the battery was increased to make it easy to generate hydrogen gas. When the mean particle diameter of the hydrogen absorbing alloy was large as 75 μm, as shown in Comparative Example 10, the true surface area of the electrode was reduced compared with that in Example 21, so that the intermediate voltage was reduced by 70 mV.

Accordingly, it is preferable that the mean particle diameter of the hydrogen absorbing alloy is in a range of 1 μm to 50 μm.

In Example 22, when a negative electrode having a rough layer in the surfaces of the hydrogen absorbing alloy particles formed by dipping in an alkaline solution was used, the battery inner pressure did not change compared with Examples 21 but the intermediate voltage was increased by 30 mV. Accordingly, it is preferable that the surfaces of the hydrogen absorbing alloy particles have a rough layer.

In Example 23, the effect of addition of the material capable of catalyzing the decomposition of hydrogen gas upon the hydrogen absorbing alloy negative electrode was examined. When platinum black capable of catalyzing the decomposition of hydrogen gas was added to the surface of the hydrogen absorbing alloy negative electrode, the battery inner pressure was further reduced to 3.5 kg/cm² compared with Example 21. This is because the vapor-phase hydrogen absorbing reaction represented by the equation (7) was accelerated in charging the battery. Any suitable material, such as platinum, palladium, palladium black, etc., other than platinum black may be used as the material capable of catalyzing the decomposition of hydrogen gas. It is a matter of course that the material may be added into the inside of the negative electrode.

In Example 24, the effect of the material capable of catalyzing the decomposition of hydrogen gas and oxygen gas in the case where the material was included in the inside of the battery in a state in which the material was not in electrical contact with the positive and negative electrodes was examined. When platinum black was disposed in the inside of the battery in a state in which it was not in contact with electrical contact with the positive and negative electrodes, the battery inner pressure was further reduced to 4.0 kg/cm² compared with Example 21. This is because the reaction of oxygen gas generated in the positive electrode and hydrogen gas generated in the negative electrode to produce water was accelerated on platinum black. Other materials, such as platinum, palladium, etc., capable of catalyzing the decomposition of hydrogen gas and oxygen gas may be used to attain the same effect.

The phenomenon in Examples 21 to 24 did not change even in the case where a negative electrode having a hydrophobic portion in the surface thereof was used. When the negative electrode having a hydrophobic portion in the surface thereof was used, the inner pressure in charging the battery was stabilized in spite of repetition of charging/discharging cycles compared with the case where a negative electrode having no hydrophobic portion was used. Further, in this case, the quantity of FEP to be added to the separator could be reduced.

From the double point of view of the battery inner pressure in charging the battery and the intermediate voltage in discharging the battery, it is preferable that the quantity of FEP to be added to the negative electrode is not larger than 1.5 mg/cm² as the mean value per unit negative electrode area.

Having described the case where the invention is applied to a nickel-hydrogen storage battery, it is a matter of course that the invention is applicable to other alkaline storage batteries, such as a manganese dioxide-hydrogen storage battery, using a hydrogen absorbing alloy negative electrode.

As described above, according to the present invention, hydrophobic resin or hydrophobic material containing hydrogen absorbing alloy powder having a hydrogen equilibrium pressure lower than that of the hydrogen absorbing alloy as a main constituent member of the electrode, an electrically conductive material and a material capable of catalyzing the decomposition of hydrogen gas is provided in the vicinity of the surface of the hydrogen absorbing alloy negative electrode. As a result, an effect arises in that a closed alkaline storage battery free from the increase of the battery inner pressure in overcharging of the battery and free from the decrease of the battery voltage in discharging the battery can be provided.

We claim:

1. An alkaline storage battery comprising: a positive electrode containing a metal oxide as a main constituent material thereof; a negative electrode containing, as a main constituent material thereof, a hydrogen absorbing alloy capable of electrochemically absorbing/desorbing hydrogen acting as an active material; an alkaline electrolytic solution; and a separator; and said negative electrode including a hydrophobic material disposed only in a surface layer of said negative electrode and including a hydrophilic material disposed only in the inside of said negative electrode, said surface layer being free of said hydrophilic material and said inside of said negative electrode being free of said hydrophobic material.

2. An alkaline storage battery according to claim 1, in which said hydrogen absorbing alloy is provided in the form of particles having innumerable rough layers at the respective particle surfaces thereof.

3. An alkaline storage battery according to claim 1, in which said hydrogen absorbing alloy is provided in the form of particles having a mean particle diameter of 1 to 50 μm.

4. An alkaline storage battery according to claim 1, in which said hydrophobic material in the surface layer of the negative electrode is a fluorine resin.

5. An alkaline storage battery according to claim 1, in which said hydrophobic material in the surface layer of the negative electrode has a permeability coefficient for oxygen/hydrogen gas, of not smaller than $1 \times 10^{-8}$ cm²/sec.atm at 25° C.

6. An alkaline storage battery according to claim 1, in which said hydrophobic material in the surface layer of the negative electrode is provided in a state in which said hydrophobic material has no surface active agent absorbed thereto.

7. An alkaline storage battery according to claim 1, in which said hydrophobic material in the surface layer of the negative electrode is selected from the group consisting of polytetrafluoroethylene resin, and tetrafluoroethylene-hexafluoropropylene copolymer.

8. An alkaline storage battery according to claim 1, in which said hydrophobic material in the surface layer of the negative electrode has a mean resin amount of 0.15 mg/cm² to 1.5 mg/cm² per unit negative electrode surface area.

9. An alkaline storage battery according to claim 1, in which a material capable of catalyzing the decomposition of hydrogen gas is contained in one member selected from the group consisting of the surface layer of the negative electrode and the hydrophilic layer disposed in the surface layer of said negative electrode.

10. An alkaline storage battery according to claim 1, in which particles of another hydrogen absorbing alloy having a hydrogen equilibrium pressure lower than that of said hydrogen absorbing alloy are contained in one member selected from the group consisting of the surface layer of the negative electrode and the hydrophilic layer disposed in the surface layer of said negative electrode.

11. An alkaline storage battery according to claim 1, in which an electrically conductive material is contained in one member selected from the group consisting of the surface layer of the negative electrode and the hydrophilic layer disposed in the surface layer of said negative electrode.

12. An alkaline storage battery according to claim 1, in which binding agent is contained in one member selected from the group consisting of the surface layer of the negative electrode and the hydrophilic layer disposed in the surface layer of said negative electrode.

13. An alkaline storage battery according to claim 12, in which said binding agent is selected from the group consisting of poly(vinyl alcohol), carboxymethyl-cellulose and methylcellulose.

14. An alkaline storage battery according to claim 12, in which said binding agent is formed of a thermoplastic resin having a melting point lower than that of said hydrophobic material, said thermoplastic resin being selected from the group consisting of polyethylene, polypropylene, poly(vinyl chloride), acrylonitrile butadiene styrene (ABS) and polystyrene.

15. An alkaline storage battery according to claim 1, in which the negative electrode contains hydrophilic resin in an amount from 0.05 to 1.0 percent by weight based on the weight of the hydrogen absorbing alloy.

16. An alkaline storage battery according to claim 1, in which the negative electrode has a porosity in a range of from 20 to 40 vol % when said battery is assembled.

17. An alkaline storage battery according to claim 1, in which said separator is formed of sulfonated polypropylene non-woven or woven fabric.

18. An alkaline storage battery according to claim 1, in which said of said negative electrode is represented by the composition formula $A_{1-X}B_XC_Y$, in which A is selected from the group consisting of La, mixtures of La and rare-earth elements, and misch metals; B is selected from the group consisting of Ti, Zr, Ca, Y, Hf and mixtures thereof; X has a value within the range $0 \leq X \leq 0.2$; C is selected from the group consisting of Ni, Co, Mn, Al, Fe, Cu, Cr and mixtures thereof; and Y has a value within the range $4.7 \leq Y \leq 5.3$, made up as follows, $Y \geq 3.5$ for Ni, $Y \leq 1.0$ for Co, $Y \leq 0.6$ for Mn, $Y \leq 0.5$ for Al, $Y \leq 0.3$ for Fe, $Y \leq 1.0$ for Cu, and $Y \leq 0.3$ for Cr.

19. An alkaline storage battery according to claim 1, in which said of said negative electrode is represented by the compositional formula $A_{1-X}B_XC_YD_Z$, in which A is selected from the group consisting of La, mixtures of La and rare-earth elements, and misch metals; B is selected from the group consisting of Ti, Zr, Ca, Y, Hf and mixtures thereof; X has a value within the range $0 \leq X \leq 0.2$; C is selected from the group consisting of Ni, Co, Mn, Al, Fe, Cu, Cr and mixtures thereof; Y has a value within a range made up as follows, $Y \geq 3.5$ for Ni, $Y \leq 1.0$ for Co, $Y \leq 0.6$ for Mn, $Y \leq 0.5$ for Al, $Y \leq 0.3$ for Fe, $Y \leq 1.0$ for Cu, and $Y \leq 0.3$ for Cr; D is selected from the group consisting of V, In, Tl, Ga and mixtures thereof; Z has a value within a range made up as follows, $0.02 \leq Z \leq 0.3$ for V, $0.02 \leq Z \leq 0.1$ for In, $0.02 \leq Z \leq 0.1$ for Tl, and $0.02 \leq Z \leq 0.1$ for Ga; and $Y+Z$ has a value within the range $4.7 \leq Y+Z \leq 5.3$.

20. An alkaline storage battery according to claim 1, in which said is provided in the form of particles having innumerable rough layers at the respective particle surfaces thereof.

21. An alkaline storage battery according to claim 1, in which said is provided in the form of particles having a mean particle diameter of 1 to 50 μm.

22. An alkaline storage battery according to claim 1, in which said hydrophobic material in the surface layer of the negative electrode has a mean resin amount of not larger than 1.5 mg/cm² per unit negative electrode surface area.

* * * * *